Aug. 17, 1965   H. W. PALKOWSKI ETAL   3,200,628
SWAGING TOOL FOR FORMING JOINTS
Filed March 18, 1963                                2 Sheets-Sheet 2
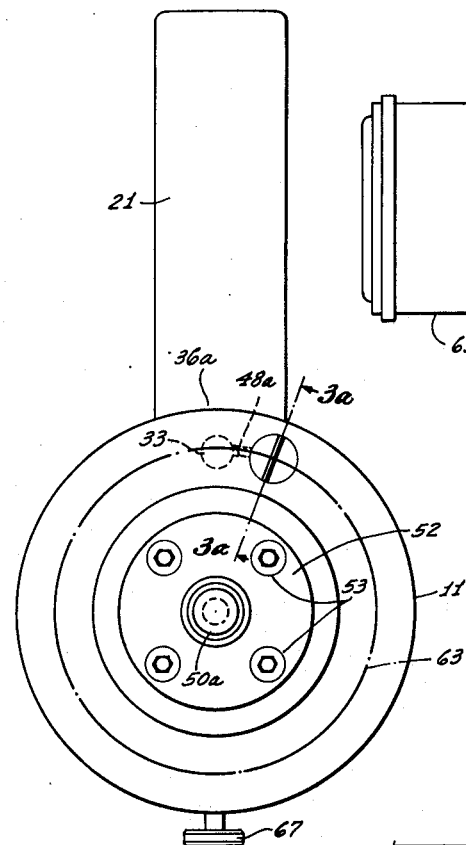
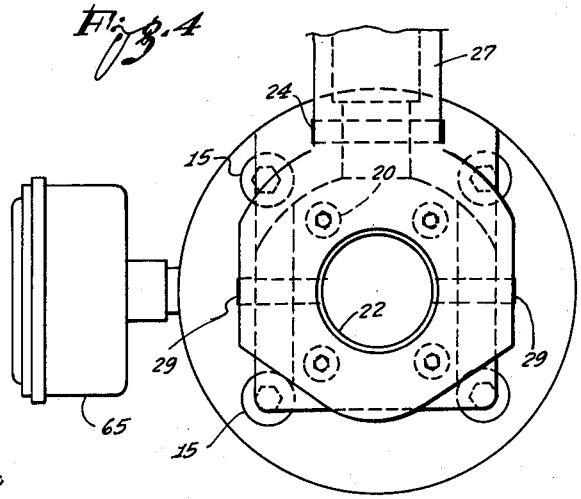
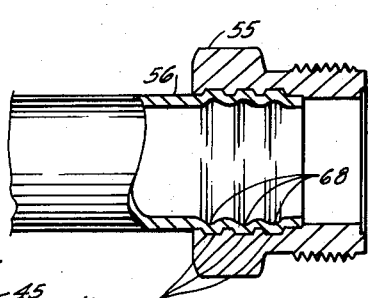
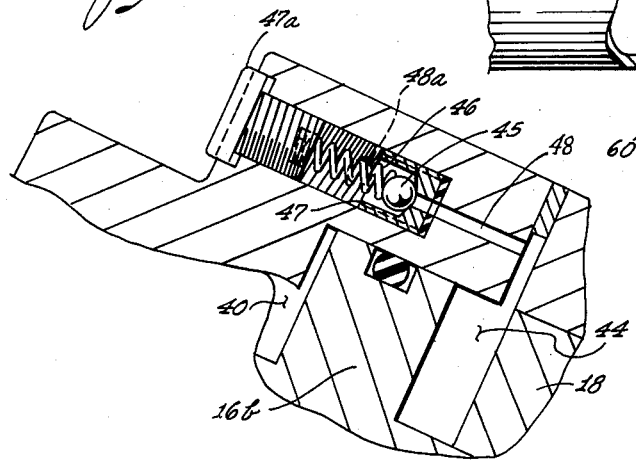
INVENTOR:
Henry W. Palkowski
Kenneth F. Lagerson
By John J. Maclago
Attorney ized Aug. 17, 1965

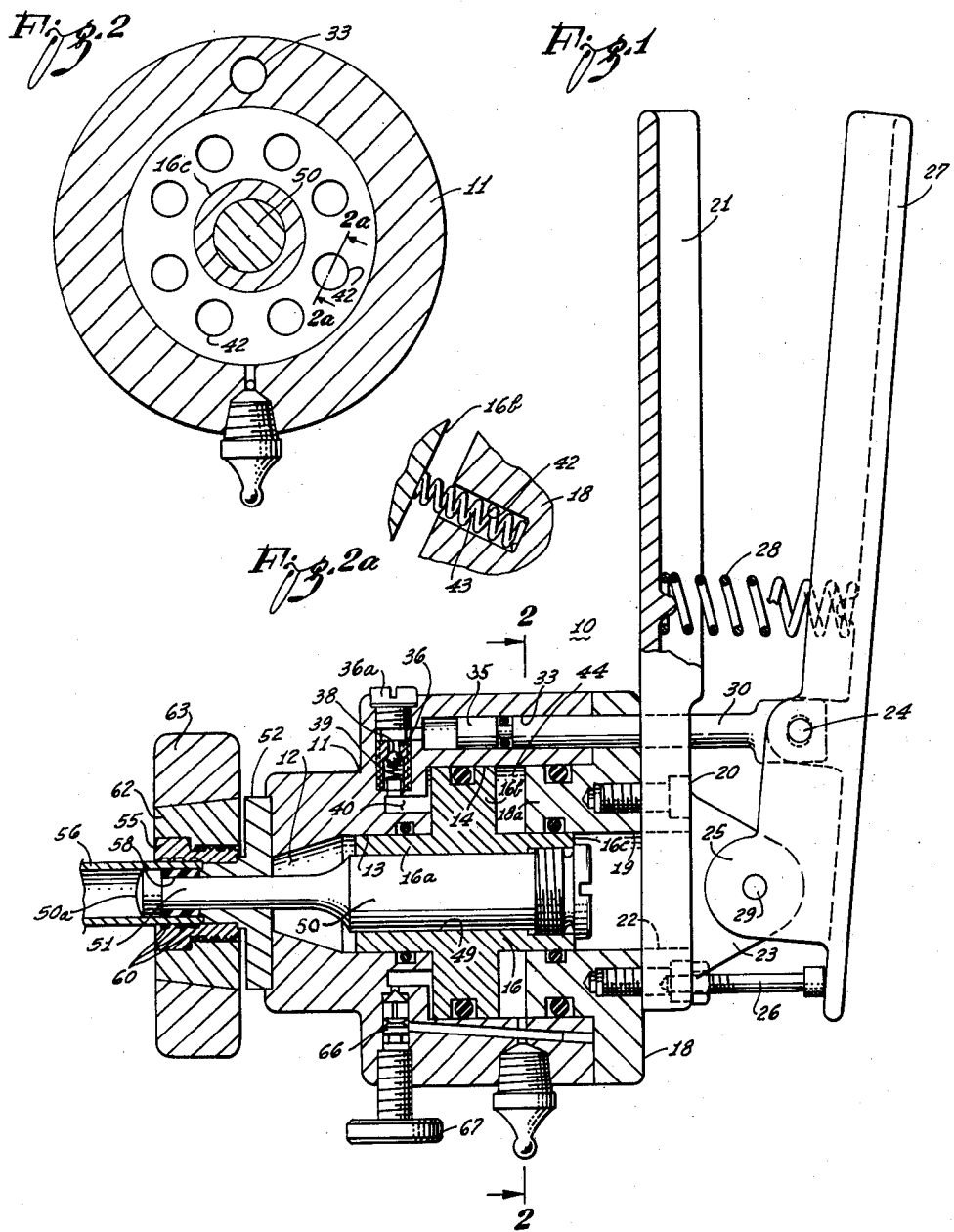

3,200,628
SWAGING TOOL FOR FORMING JOINTS
Henry W. Palkowski, 27441 Rainbow Ridge Road, Rolling Hills, Calif., and Kenneth F. Lagerson, 17411 Lassen St., Northridge, Calif.
Filed Mar. 18, 1963, Ser. No. 265,854
7 Claims. (Cl. 72—62)

This invention relates to a means and method for connecting fittings to light weight tubings such that the connecting joints are able to seal relatively high pressure fluids, and more particularly, to a swaging tool for providing such joints.

It is highly important, especially in the rocket and related space fields where weight must be maintained to a strict minimum, to securely join fittings or ferrules onto light weight tubing such that the final assembly can safely withstand pressures on the order of many thousand pounds per square inch while conveying liquid oxygen or other such fluids or gases used for fueling purposes.

The known approaches for connecting fittings to tubings are not desirable for such applications since they tend toward weakening the material forming the tubing, thus requiring relatively thicker walled tubing than would otherwise be required in order to withstand the high pressures desired. Thus when the fittings are brazed on the tubing, the heat used during the process lowers the tensile strength of the tubing material, requiring that the thickness of the wall be increased to provide the required strength. When the fitting is secured on the tubing by the flaring of the end of the tube, the material forming the tubing must have a low tensile stress in order to avoid cracking of the flared ends, and thus, when using this approach, a heavier walled tubing is needed to withstand high pressure usage. If threading is employed for securing the fitting to the tubing, the tubing must be made of much heavier stock due to the loss in strength caused by the threads. Another problem that may exist in many applications is that the process or approach used to connect the fitting to the tubing must not employ any materials which might contaminate the fluid to be conveyed by the tubing.

Accordingly, one of the objects of the present invention is to provide a simple, fast operating means and method of swaging for joining fittings to lightweight tubing.

Another object of this invention is to provide a swaging tool for forming joints which are capable of conveying fluids at high pressures without leakage.

Another object of this invention is to provide a swaging tool for simply forming gas or fluid tight joints on concentrically fitted mating elements without the use of fillers or similar substances which might contaminate the fluids.

These and other objects and features of the invention will become more evident as disclosure of the invention is made in the following figures in the drawings, in which:

FIG. 1 is a view, mostly in cross section, of the swaging tool of the present invention;

FIG. 2 is a cross section of the housing of the swaging tool taken along lines 2—2 of FIG. 1;

FIG. 2a is a cross section of one of the openings in the housing containing a piston-return-spring taken along lines 2a—2a of FIG. 2;

FIG. 3 is a front view of the swaging tool of FIG. 1 showing the spacer and mandrel in position in the tool before the latter is inserted into the assembly of the fitting and the tubing to be swaged;

FIG. 3a is a view of the return valve taken along the lines 3a—3a of FIG. 1; and FIG. 4 is a rear view of the swaging tool shown in FIG. 1; and FIG. 5 is a view, partly in section, of a fitting that has been swaged onto a tubing by the tool shown in FIG. 1.

Referring to FIG. 1, a side view of the swaging tool of the present invention is shown, with most of the parts in section, in order to clearly disclose the structural features and the operation thereof.

The swaging tool includes a hydraulic pump 10 comprised of a circular outer body or housing 11 provided with an opening or bore 12 formed in the center thereof. The bore 12 enlarges to a first diameter which forms a first sliding surface 13, and then steps to a second larger diameter which forms a second sliding surface 14. A working piston 16 is fitted to move in the bore of housing 11 by hydraulic pressure. The front cylindrical end 16a of piston 16 is turned to a diameter to mate with the sliding surface 13, and the middle cylindrical portion 16b of piston 16 is turned to a larger diameter to mate with the sliding surface 14 of the bore in housing 11. The housing 11 is provided with an end cover 18 which is held thereon by four screws 15 (FIG. 4). The front cylindrical portion 18a of end cover 18 is turned to an outer diameter which conforms with surface 14 of the housing 11. The surface 19 of a central opening in the end cover 18 conforms with the surface 13 of the housing 10 and provides a sliding surface for the back cylindrical end 16c of piston 16. The surfaces of the piston 16 which mate with the surfaces of the bore in the housing 11 are provided with O rings, as shown. Attached to the outer surface of end cover 18 by four screws 20 (FIG. 4) is a handle 21. On either side of a central opening 22 provided in handle 21 is a bracket 23 whose sides mate with the sides of a similar bracket 25 provided on a handle lever 27. The sides of these brackets are secured by dowel pins 29 such that the handle lever 27 can pivot about the dowels relative to fixed handle 21. To facilitate the pumping action of handle lever 27, a spring 28 urges handle lever 27 away from handle 21 by forcing the latter to rotate about dowel 29 such that the bottom end of lever 27 engages a stop 26 extending from the lower bracket portion of handle 21.

Attached to handle lever 27 by a dowel 24 passing through an upper extended portion of bracket 25 is a piston rod 30 which extends into a hydraulic passage 33 provided in the wall of housing 11. On the end of rod 30 is an oil-displacing piston 35. Piston 35, when moved by the action of handle lever 27, forces oil through a valve 36 by causing ball 38 to be forced against its retaining spring 39 away from its seat. This action forces hydraulic pressure to build up in front chamber 40 formed in housing 11 to force the working piston 16 to move to the right. As shown in FIG. 3a, the movement of working piston 16 toward the right causes the oil pressure in the rear chamber 44 formed in housing 11 to build up so as to unseat the ball 45 of return valve 47 against spring 46 to cause oil to be conveyed from passage 48 via interconnecting passage 48a (FIG. 3) to the portion of passage 33 ahead of piston 35, such that the next action of handle lever 27 forces return valve 47 to close and the oil in passage 33 to be conveyed into front chamber 40 so as to move working piston 16 still further to the right. To assist in returning the working piston 16 back to its forward position after the swaging operation is completed, as will be explained infra, the end cover 18 is provided as shown in FIG. 2a with openings 42 in which springs 43 can be inserted. These springs 43 are compressed when the piston 16 is moved toward its rear position, forcing the piston to return to its forward position when the pressure is released in front chamber 40 by the opening of pressure relief valve 66.

Fitted into a central opening 49 provided in working piston 16 is a mandrel 50 whose body is threaded on the end thereof so that it can be held by similar threads in the opening provided in portion 16c of piston 16. Mandrel 50 is thus secured to move with piston 16. Provided on the front of housing 11 and held thereon by four screws 53 (FIG. 3) is a spacer 52. The spacer may be cut along the diameter thereof to form two halves to facilitate placing it on the mandrel. This spacer 52 has its front surface machined to conform with the end of the fitting 55 to be swaged onto the tubing 56. Mandrel 50 has a rounded front end or nose 50a whose diameter is equal to the inside diameter of tubing 56 and a shaft portion 51 of a reduced diameter. Nose 50a may be turned on the end of shaft portion 51, or it may be in the form of a nut secured by threads provided on the front end of shaft portion 51. An expander or sleeve 58 formed of a solid rubber or plastic material which is resilient when subjected to a force but readily returns to its original shape when the force is removed, encircles shaft portion 51 of mandrel 50. When the expander 58 is properly positioned on shaft portion 51, the outer diameter thereof should permit it to snugly fit into the tubing 56. Furthermore, the left end of expander 58 should abut against the shoulder of the end 50a of the mandrel 50, and the right end of the expander 58 should abut up against the front surface of spacer 52. The fitting 55 placed on the tubing 56 is provided on its inside surface with three annular grooves 60. On the outside of the fitting 55 is placed a jaw 62 whose inner surface is adapted to conform with the outer shape of the head of fitting 55. Jaw 62, similarly to spacer 52, is cut along the diameter thereof to form two halves. Over the tapered outer surface of jaw 62 is positioned a closely fitting one piece tapered retaining ring 63.

Having described the structural arrangement of the swaging tool assembly of FIG. 1, the swaging operation will next be described. In preparation for the swaging operation, the proper sized draw mandrel 50 must first be selected for the tubing 56 and fitting 55 to be joined. This mandrel is then inserted into the rear of the housing 11 through the hole 22 in the handle. By use of an adequate screw driver, the body of mandrel 50 is then rotated in the fitted and threaded opening 49 of working piston 16 until it is full seated. The appropriate sized spacer 52 is next attached to the front of housing 11. The four attaching screws 53 for the spacer should be firmly seated and the hub portion of spacer 52 should support the shaft 51 of the draw mandrel 50 without binding or bending. Next the rubber expander or sleeve 58 should be moistened and slipped onto the shaft portion 51 of the draw mandrel 50. The use of a nut for nose portion 50a, being removable, facilitates the mounting of the sleeve 58 and spacer 52. The tool is now ready to be used.

To affect assembly of fitting 55 to tubing 56, the first step is to square the end of the tubing. It should be noted that the inner diameter of the tubing should not be reduced in diameter or flared outward at its cut end. Next the fitting 55 should be placed over the end of the tubing 56 making sure that the tubing is fully seated at the bottom of the counter bore provided in the fitting. The assembly is next ready to have the split jaws 62 placed around the fitting 55 so as to completely support the fitting, as shown in FIG. 1. The tapered retaining ring 63 should then be slipped over the tapered jaws, making sure that the jaws are completely within the length of the retaining ring.

To affect the swaging operation, the rubber expander or sleeve 58 is moistened and the nose 50a of draw mandrel 50 is inserted into the tubing 56 until the ends of the fitting 55, the tubing 56 and the sleeve 58 all bottom on the front surface of the spacer 52, as shown in FIG. 1. After turning the thumb screw 67 of pressure relief valve 66 into a clockwise direction to ensure that the pressure in front chamber 40 can build up, the handle lever 27 of the hydraulic pump 10 is then operated until the pressure gauge 65 (FIG. 4) shows the required pressure. It should then be noted that the inward movement of the draw mandrel 50 squeezes the ends of the expander 58 together. Since the expander or sleeve 58 is formed of rubber or a similar resilient material, the reduction of its longitudinal dimension due to the axial squeezing action of the mandrel forces the expander to expand radially outwardly against the wall of the tubing 56. The wall of the tubing can only give by expanding or being swaged into the three grooves 60 formed on the inside surface of the fitting 55. The amount of force needed on draw mandrel 50 to perform the swaging operation depends, of course, on the size of the tubing. For example, a tube having a wall thickness of .035 inch would require that a pressure of 1,250 p.s.i. be built up on gauge 65 to properly form the joint. After the swaging has been accomplished, the pressure valve 66 in the pump 10 is released by turning thumb screw 67 into a counterclockwise direction permitting the working piston 16 to be returned by springs 43 (FIG. 2a) to its forward position which relieves the longitudinal or axial force on the expander or sleeve 58 permitting it to return to its original shape whereby the nose 50a of mandrel 50 can be readily slipped out of the tubing 56.

It should be noted that the joint or seam thus formed can be easily detected by inspecting the three annular indentations 68 (FIG. 5) formed within the tubing where the wall thereof was deformed into the grooves 60 provided inside fitting 55. If these indentations are readily visible, the swaging has been accomplished. Moreover, joints formed by this invention are very positive and can reliably withstand pressures up to as much as 10,000 p.s.i. or more.

It should be further noted that the purpose of the split jaws 62 and the retaining ring 63 is to maintain the outside dimensions of the fitting 55 when subjected to the radial forces created by the squeezing of expander or sleeve 58. Thus each size and shape of fitting 55 must have a set of split jaws to fit that particular fitting. If the split jaws 62 were not properly seated on the fitting 55 and inside the retaining ring 63, the fitting might have increased in size beyond the elastic limit of the material, causing permanent deformation. If this had taken place, the fitting swaged on the tubing would not mate with the other parts of the assembly to be formed. The use of the split jaw 62 and the split spacer 52 make it easy to place and remove these parts from their positions over the fittings and mandrel. It should be noted that the materials for the fitting and the tubing must be chosen to have the proper elastic limit and yield point such that, as a result of the swaging operation, the tubing wall will deform into the annular grooves but the fitting itself will not be deformed. It should be further noted that when the fitting and the tubing assembly is subjected to the radial forces which deform the tubing wall, the fitting also can be slightly enlarged due to tolerances or expansion of the jaw retaining ring. However, this enlargement is not permanent and when the radial force is removed, the returning of the fitting back to its original shape helps to form a stronger joint on the tubing.

It will be apparent from the above description that there is thus provided a means and method of the character described possessing the particular features of advantage previously enumerated as desirable, but which obviously are susceptible of modification in form, proportion, detail construction and arrangement of parts without departing from the principle involved or sacrificing any advantages.

Thus, while in order to comply with the statute, the invention has been described in language more or less specific as to structural features, it is to be understood that the invention is not to be limited to the specific features shown, but that the means and construction herein disclosed comprise a preferred form of putting the invention into effect and the invention, is, therefore, claimed in any of its forms or modifications within the legitimate and valid scope of the appended claims.

What is claimed is:

1. A swaging tool for joining a fitting having a recess on the inner wall thereof onto a tubing to form a high pressure seal assembly comprising: a draw mandrel having a nose portion whose diameter is equal to the inside diameter of said tubing and a shaft portion of a reduced diameter; a sleeve formed of a resilient material and positioned on the shaft portion of said mandrel such that one end of the sleeve abuts against said nose portion; a spacer positioned so as to slidably support said mandrel, said mandrel adapted to be inserted into the end of the tubing having the fitting thereon with the surface of said spacer adapted to abut against the other end of the sleeve, retaining means adapted to encircle said fitting for fully supporting the outer surface of said fitting radially opposite the inner surface thereof provided with said recess; hydraulic means for building up a hydraulic force for axially moving said mandrel relative to said spacer to cause said sleeve to expand radially outwardly to thereby swage the wall of said tubing to conform to the inner wall of said fitting; and a pressure gauge for indicating when said hydraulic force has reached a predetermined value so as to form a binding pressure-tight connection between the walls of said tubing and said fitting.

2. A swaging tool for swaging a fitting having a plurality of annular grooves on the inside surface thereof onto a tubing to form a high pressure joint comprising: a draw mandrel having a nose portion whose diameter is equal to the inside diameter of said tubing and a shaft portion of a reduced diameter; a sleeve formed of a resilient material and positioned on the shaft portion of said mandrel to abut against said nose portion; a spacer provided with a front abutting surface positioned on said mandrel, said mandrel adapted to be inserted into the end of the tubing having the fitting thereon with the surface of said spacer adaped to abut against the ends of the fitting, the tubing and the sleeve; retaining means adapted to be assembled about said fitting for supporting the outer surface of said fitting against whose inner surface the wall of the tubing is to be expanded; and means for axially moving said mandrel relative to said spacer to axially compress the sleeve and cause the sleeve to expand radially outwardly, thereby permanently deforming the wall of said tubing into the annular grooves of said fitting to form a high pressure sealing engagement between the walls of the tubing and the fitting.

3. A joining tool for swaging a fitting having a plurality of annular grooves on the inside surface thereof onto a tubing formed of a material that is deformable under pressure, comprising: a draw mandrel having a nose portion whose diameter is equal to the inside diameter of said tubing and a shaft portion of a reduced diameter; a sleeve formed of a resilient material and positioned on the shaft portion of said mandrel to abut against said nose portion; a spacer having a front surface and a hub portion encircling and slidably supporting said mandrel, said mandrel adapted to be inserted into the end of the tubing having the fitting thereon with the surface of said spacer adapted to abut against the ends of the fitting, the tubing and the sleeve; holding means cut along the diameter thereof to form two halves and adapted to encircle and fully contact the outside surface of said fitting; a retaining ring for supporting the halves of said holding means; and means for axially pulling said mandrel into said spacer to cause said sleeve to expand radially outwardly, to thereby create a pressure to permanently deform the wall of said tubing into the annular grooves of said fitting to form a high pressure joint.

4. A swaging tool for swaging a fitting onto a tubing comprising: a retaining means adapted to encircle and support a fitting having a grooved inside surface which contacts the outer surface of a tubing formed of a material that is deformable under pressure; a mandrel; a sleeve formed of a resilient material positioned on said mandrel, said mandrel adapted to be inserted into said tubing with said sleeve located radially opposite the grooved surface of said fitting; and hydraulic means for axially squeezing said sleeve to cause the material of said sleeve to expand radially outwardly to thereby create a pressure to permanently deform the surface of said tubing into the grooved surface of said fitting to firmly secure the tubing and fitting in fluid-tight relationship.

5. A swaging tool for swaging a fitting onto a tubing comprising: a retaining means adapted to encircle and support a fitting against radially outward expansion, said fitting having annular grooves on its inside surface which surface contacts the outer surface of a tubing which is to be expanded into said fitting; a mandrel; a sleeve formed of a resilient material positioned on said mandrel, said mandrel adapted to be inserted into said tubing with said sleeve located radially opposite the annular grooves of said fitting; and means for axially squeezing said sleeve to cause the material of said sleeve to expand radially outwardly to thereby permanently deform the wall of said tubing into the annular grooves of said fitting to form a high pressure seal.

6. A swaging tool for swaging a fitting onto a tubing to form a high pressure seal assembly comprising: a retaining means adapted to encircle and support a fitting having annular grooves on its inside surface which surface contacts the outer surface of a tubing; a mandrel; a sleeve formed of a resilient material positioned on said mandrel, said mandrel adapted to be inserted into said tubing with said sleeve located opposite the annular grooves of said fitting; means for applying an axial force to said mandrel to cause the material of said sleeve to expand radially outwardly to thereby permanently deform the wall of said tubing into the annular grooves of said fitting to form a sealed joint; and means for releasing the axial force on said mandrel to permit said sleeve to return to its original shape, whereby said mandrel can be removed from said assembly.

7. A swaging tool for swaging a fitting having a plurality of annular grooves on the inside surface thereof onto a tubing formed of a material that is deformable under pressure, comprising: an expander formed of a resilient material; a spacer providing an abutting surface for said expander, said expander adapted to be inserted into the end of a tubing having a fitting thereon with the surface of the spacer adapted to abut against the end of the expander; retaining means adapted to encircle said fitting for supporting the outer surface of said fitting opposite the inside surface thereof provided with said grooves; hydraulic means including means for providing an increasing hydraulic force for axially forcing said expander against said spacer to cause said expander to expand radially outwardly to thereby create a pressure for permanently deforming the wall of said tubing into the annular grooves of said fitting; and means for indicating when said hydraulic force has reached a predetermined value so as to form a high pressure joint between the inside surface of said fitting and the outer wall of said tubing.

References Cited by the Examiner

UNITED STATES PATENTS

| | | | |
|---|---|---|---|
| 2,370,776 | 3/45 | Carlson | 113—44 |
| 2,370,840 | 3/45 | Carlson | 113—44 |
| 2,458,854 | 1/49 | Hull | 113—44 |
| 2,535,403 | 12/50 | Froggatt | 153—79 |
| 3,113,377 | 12/63 | Oakes | 113—44 |

CHARLES W. LANHAM, *Primary Examiner.*